United States Patent [19]
Ollivier

[11] Patent Number: 5,381,955
[45] Date of Patent: Jan. 17, 1995

[54] ANTI-HAIL SHOCK WAVE GENERATOR

[76] Inventor: Gérald Ollivier, 1625 Lincoln Avenue, #1901, Montreal, Quebec, Canada, H3H 2T5

[21] Appl. No.: 138,592

[22] Filed: Oct. 18, 1993

[51] Int. Cl.⁶ .......................................... E01H 13/00
[52] U.S. Cl. .................................................. 239/14.1
[58] Field of Search .............. 29/463, 890.142, 469.5; 228/184, 173.4; 239/14.1, 600, 1

[56] References Cited

U.S. PATENT DOCUMENTS

| | | |
|---|---|---|
| 684,030 | 10/1901 | Wright ............................ 239/14.1 X |
| 2,192,471 | 3/1940 | Harbison ................................ 29/463 |
| 2,815,982 | 12/1957 | Bleamaster . |
| 2,968,713 | 1/1961 | Harper .................................. 219/93 |
| 3,362,915 | 1/1968 | Micek . |
| 3,645,446 | 2/1972 | Patten . |
| 3,848,801 | 11/1974 | Ollivier et al. . |
| 3,969,842 | 7/1976 | Velie ............................. 239/14.1 X |
| 4,835,359 | 5/1989 | Sciortino ........................... 29/463 X |

FOREIGN PATENT DOCUMENTS

| | | | |
|---|---|---|---|
| 62943 | 5/1977 | Japan .................................. 228/184 |
| 1012056 | 12/1965 | United Kingdom . |

Primary Examiner—Andres Kashnikow
Assistant Examiner—Kevin Weldon
Attorney, Agent, or Firm—Merchant & Gould Smith, Edell, Welter & Schmidt

[57] ABSTRACT

The shock wave generator has a barrel made of four half conical shells with a vertical seam line plane of the Upper shells perpendicular to a vertical seam line plane of the lower shells. The upper and lower shells are connected about a horizontal circular seam line. The barrel guides shock waves for hailstone nuclei disruption and is resistant to mechanical shock and thermal stress endured during higher frequency operation.

8 Claims, 2 Drawing Sheets

ANTI-HAIL SHOCK WAVE GENERATOR

FIELD OF THE INVENTION

The present invention relates to an anti-hail shock wave generator having an improved barrel.

BACKGROUND OF THE INVENTION

An anti-hail shock wave generator or cannon is known in the art from U.S. Pat. No. 3,848,801. In such a device, a shock wave is generated by detonating an explosive mixture of combustible gas and air in a combustion chamber having an upper orifice. A conical barrel is fit over the upper orifice and directs the shock wave resulting from the explosion upwardly to the sky. By firing the generator at regular intervals (e.g. less than 25 seconds, and usually every 8 to 14 seconds), a succession of shock waves are created which disrupts the internal microstructure of the clouds to prevent the formation of hail nuclei within a small area (typically a 500 m radius) over the generator. It is believed that transport of positive ions from ground level to cloud level by the succession of shock waves is largely responsible for the disruption of the formation of hail nuclei.

By using the known device, crop damage due to hail has been known to be completely eliminated or at least significantly reduced without any adverse environmental effects, however, to achieve good results, special care must be taken to operate the device properly starting about 15-30 minutes before a hail storm in order to disrupt sufficiently the hailstone formation process. By operating the device at a faster firing rate (less than 8 seconds between ignitions), the combustion chamber and the barrel are subjected to more mechanical and temperature stress, and more fuel is consumed.

SUMMARY OF THE INVENTION

It is an object of the present invention to provide an anti-hail shock wave generator with a barrel capable of guiding the shock wave with minimum interference while withstanding mechanical stresses as fuel is ignited in the combustion chamber at an increased frequency.

According to the invention, there is provided an anti-hail shock wave generator comprising a combustion chamber having an upper orifice, fuel injection means for injecting fuel into the combustion chamber, ignition means for igniting the fuel in the chamber, a conical barrel having a small diameter lower end connected to the chamber's upper orifice and a large diameter upper end, the barrel comprising two lower shell members connected together along two opposed lower vertical seam lines and two upper shell members connected together along two opposed upper vertical seam lines, the lower shell members being connected to the upper shell members with the lower seam lines abutting a middle of a bottom of the upper shell members respectively and with the upper seam lines abutting a middle of a top of the lower shell members respectively.

Preferably, the lower shell members are thicker than the upper shell members which have a thickness of 2.5 to 4.0 mm and 1.5 to 3.0 mm respectively. Also, the shell member may be made of stainless steel sheets.

BRIEF DESCRIPTION OF THE DRAWINGS

The invention will be better understood by way of the following detailed description of a preferred embodiment with reference to the appended drawings in which.

DETAILED DESCRIPTION OF THE PREFERRED EMBODIMENT

Figure 1:
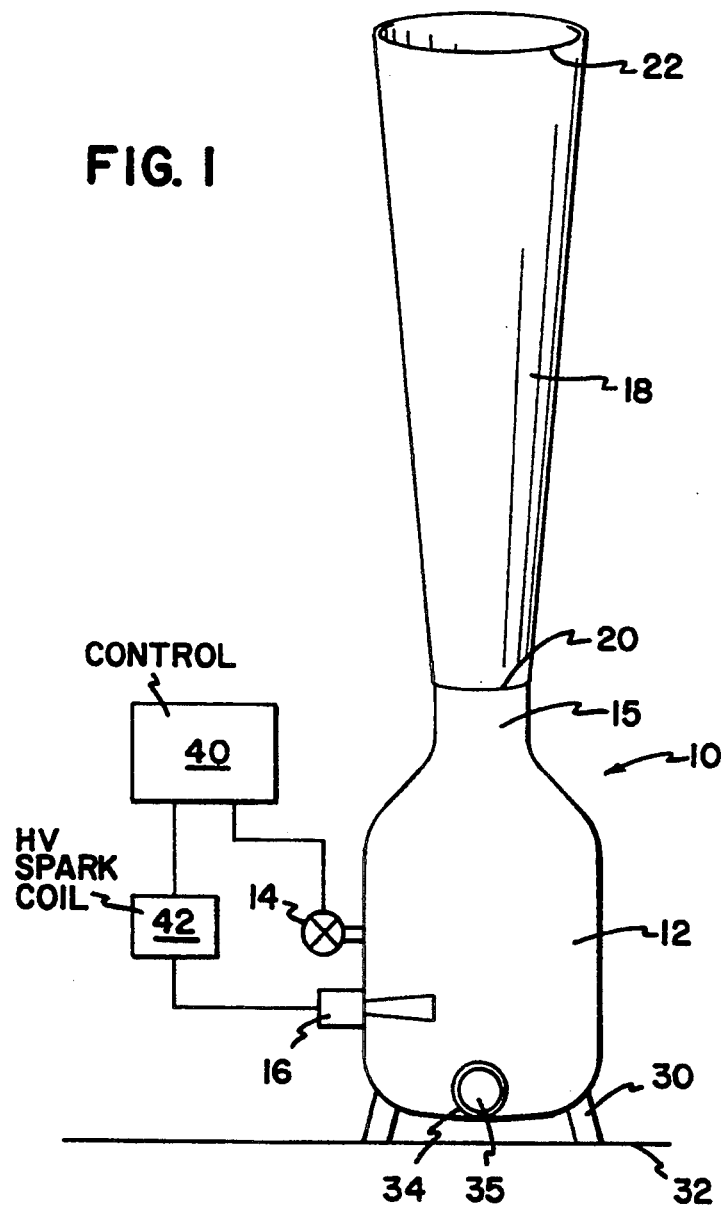
FIG. 1 is a side view of the anti-hail shock wave cannon according to the preferred embodiment.

As shown in FIG. 1, cannon (10) comprises a combustion chamber (12) which may comprise a substantially cylindrical body with a rounded bottom and a rounded top portion which leads into a neck (15). The bottom of combustion chamber (12) is solidly mounted to a concrete pad (32) by feet (30). One or more air inlet ports (34) are provided with flaps (35) which are seated in ports (34) and open inwardly to provide one way valves for air rushing into chamber (12) after each ignition. Chamber (12) is provided with a fuel injector (14) which may comprise a solenoid valve controlling flow of acetylene gas from an acetylene gas reservoir (not shown) into a central portion of chamber (12). Ignition means (16) are provided for igniting the acetylene gas injected into chamber (12), and ignition means (16) comprise spark gap electrodes and a high voltage generator coil (42). The spark gap generator coil (42) and solenoid valve (14) are controlled by control means (40). A conical barrel (18) has a large diameter upper end (22) and a small diameter lower end (20) which is connected to an upper orifice in neck (15) of chamber (12).

When the shock wave generator cannon (10) is operated, control means (40) cause gas to be released through solenoid valve (14) into chamber (12) until sufficient gas for a full explosion resulting in a significant shock wave is present in chamber (12). Mixing of the acetylene gas with air in chamber (12) is automatic and rapid. A short time after solenoid valve (14) is closed, control means (40) trigger spark gap coil (42) to create a high voltage pulse resulting in a spark across the electrodes of ignition means (16). As the gas in chamber (12) rapidly combusts, a shock wave results which is directed by conical barrel (18). The momentum of the combustion gases is directed upwardly, and once the combustion gases have fully expanded, the upward momentum of the gases causes a negative pressure to be created in the combustion chamber (12) which results in flap (35) being drawn open so that fresh air may be drawn from ambient through port (34) to fill combustion chamber (12).

It is important to select a fuel and ignition system which can operate even when rain water passes through barrel (18) into chamber (12). It is important to select the parameters of fuel, combustion chamber volume to upper orifice size as well as barrel (18) dimensions in order that a good shock wave is generated and sufficient aspiration through ports (34) takes place in order to bring in sufficient fresh air for the next combustion.

Figure 2:
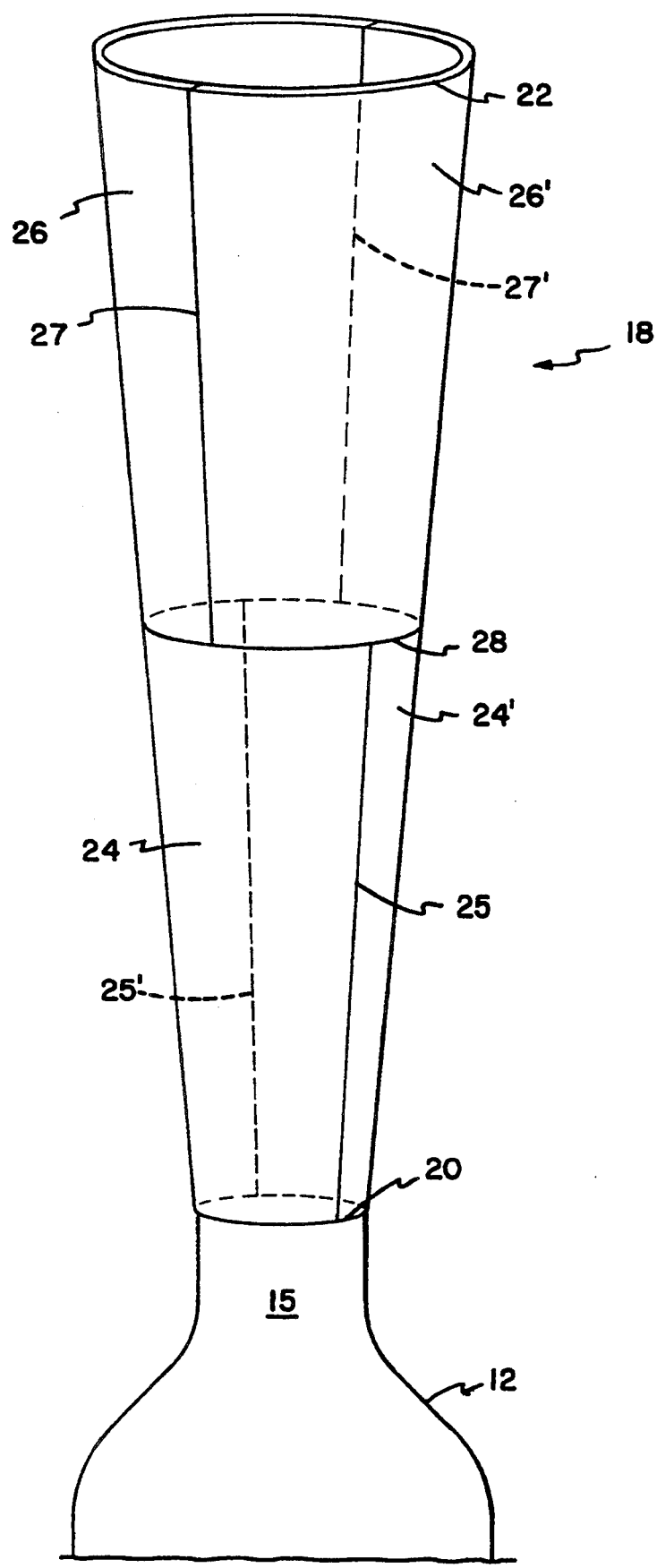
FIG. 2 is a detailed perspective view of the conical barrel according to the preferred embodiment.

As shown in FIGS. 1 and 2, barrel (18) is made of four sheets of stainless steel which are cut to shape and welded together to form barrel (18). Two lower sheets (24) and (24') are shaped to form half conical shells of a lower portion of barrel (18). The half shells (24) are joined about a pair of seam lines 25 and 25'. The upper half shells (26) and (26') are likewise joined about seam lines (27) and (27'). The upper shell members (26) are connected to the lower shell members (24) about a horizontal circular seam line (28) such that seam lines (25)

and (25') are rotated at about 90° with respect to seam lines (27) and (27'). Preferably, the sheets are welded together with the weld joint on the outside of the barrel to leave a smoother inside surface of the barrel. The arrangement of seam lines illustrated results in good mechanical strength even at elevated temperatures of operation and large temperature gradients which result from the cannon then being operated during a rain or hail storm. The arrangement of the seam lines is also conducive to an appropriate "tuning" in that vibrations in barrel (18) resulting from the combustion and shock wave are dampened appropriately. It has also been found that the arrangement of seam lines is conducive to the generation of a good shock wave. Initial tests have been promising in that the sound of the shock wave generated using the improved barrel design is stronger.

The preferred thickness for the stainless steel sheets (24) and (26) is 2.5 mm to 4.0 mm and 1.5 mm to 3.0 mm respectively. The preferred material for combustion chamber (12) is steel having a wall thickness of 0.6 to 1.0 cm. Ports (34) are preferably two in number and have a diameter of about 15 cm. The height of barrel (18) is about 4 m, its upper opening diameter is about 80 cm and its lower opening diameter is about 10 to 14 cm. The combustion chamber has an internal diameter of about 45 cm and a volume of about 160 to 180 liters. The volume of acetylene gas injected is about 5 to 10 liters and the recommended time period between ignitions is 3.5 to 6 seconds.

Although the invention has been described above with reference to the example of the preferred embodiment, it is to be understood that other embodiments are contemplated by the invention as defined in the appended claims.

I claim:

1. An anti-hail shock wave generator comprising:
   a combustion chamber having an upper orifice;
   fuel injection means for injecting fuel into said chamber;
   ignition means for igniting said fuel in said chamber;
   a conical barrel having a small diameter lower end connected to said upper orifice and a large diameter upper end, said barrel comprising two lower shell members connected together along two opposed lower vertical seam lines and two upper shell members connected together along two opposed upper vertical seam lines, said lower shell members being connected to said upper shell members with said lower seam lines abutting a middle of a bottom of said upper shell members respectively and with said upper seam lines abutting a middle of a top of said lower shell members respectively.

2. The generator as claimed in claim 1, wherein said upper and said lower shell members are made from stainless steel sheets.

3. The generator as claimed in claim 1, wherein said upper and said lower shell members are connected by welding outer surfaces of said shell members together.

4. The generator as claimed in claim 1, wherein said barrel has a height between 3 m and 6 m and said lower and said upper shell members have a thickness of between 2.5 mm to 4.0 mm and 1.5 mm to 3.0 mm respectively.

5. The generator as claimed in claim 2, wherein said upper and said lower shell members are connected by welding outer surfaces of said shell members together.

6. The generator as claimed in claim 5, wherein said barrel has a height between 3 m and 6 m and said lower and said upper shell members have a thickness of between 2.5 mm to 4.0 mm and 1.5 mm to 3.0 mm respectively.

7. The generator as claimed in claim 1, wherein said upper shell members are thinner than said said lower shell members.

8. The generator as claimed in claim 5, wherein said upper shell members are thinner than said said lower shell members.

* * * * *